US010300967B2

(12) United States Patent
    Jee (10) Patent No.: US 10,300,967 B2
(45) Date of Patent:    May 28, 2019

(54) TRACK AND TRACK ROLLER

(71) Applicant: SRJ, Inc., Schaumburg, IL (US)

(72) Inventor: Woo Young Jee, Inverness, IL (US)

(73) Assignee: SRJ, Inc., Schaumburg, IL (US)

( * ) Notice: Subject to any disclaimer, the term of this patent is extended or adjusted under 35 U.S.C. 154(b) by 337 days.

(21) Appl. No.: 15/185,203

(22) Filed: Jun. 17, 2016

(65) Prior Publication Data

US 2017/0361884 A1    Dec. 21, 2017

(51) Int. Cl.
    *B62D 55/14*    (2006.01)
    *B62D 55/24*    (2006.01)
    *B62D 55/15*    (2006.01)

(52) U.S. Cl.
    CPC ............. *B62D 55/14* (2013.01); *B62D 55/24* (2013.01); *B62D 55/15* (2013.01)

(58) Field of Classification Search
    CPC ....... B62D 55/14; B62D 55/145; B62D 55/15
    See application file for complete search history.

(56) References Cited

U.S. PATENT DOCUMENTS

| 5,161,866 A * | 11/1992 | Johnson ................. B62D 55/14 |
| | | 305/136 |
| 5,803,558 A | 9/1998 | Ketting et al. |
| 6,120,405 A | 9/2000 | Oertley et al. |
| 6,129,426 A * | 10/2000 | Tucker ................. B62D 55/065 |
| | | 305/136 |
| 6,435,291 B2 * | 8/2002 | Lemke ................... B62D 55/10 |
| | | 180/9.58 |
| 7,108,337 B2 * | 9/2006 | Yamamoto ............. B62D 55/14 |
| | | 305/129 |
| 7,533,945 B2 | 5/2009 | Jee et al. |
| 8,590,986 B2 | 11/2013 | Kim et al. |
| 9,067,631 B1 | 6/2015 | Lussier et al. |
| 2003/0019133 A1 | 1/2003 | Hori |
| 2006/0237239 A1 | 10/2006 | Bruner et al. |
| 2007/0017713 A1 | 1/2007 | Sewell et al. |
| 2011/0316330 A1 | 12/2011 | Doyle |
| 2012/0228926 A1 * | 9/2012 | Bair ...................... B62D 55/14 |
| | | 305/136 |
| 2015/0259016 A1 | 9/2015 | Reshad et al. |

FOREIGN PATENT DOCUMENTS

| JP | 61064588 A * | 4/1986 | ............ B62D 55/14 |
| WO | 2014022043 A1 | 2/2014 | |
| WO | 2014056089 A1 | 4/2014 | |

* cited by examiner

*Primary Examiner* — Jason R Bellinger
(74) *Attorney, Agent, or Firm* — Shumaker & Sieffert, P.A.

(57) ABSTRACT

A system includes a track and a track roller. In some examples, the track roller includes an axle member and at least three flange members. The axle member defines a first axis. The at least three flange members extend from the axle member substantially perpendicularly to the first axis. A first portion of the axle member is disposed between a first pair of adjacent flange members of the at least three flange members. A second portion of the axle member is disposed between a second pair of adjacent flange members of the at least three flange members. Each of at least two of the at least three flange members and the first and second portions are configured to contact the track when the track is mounted on a vehicle suspension system including the track roller.

20 Claims, 5 Drawing Sheets

TRACK AND TRACK ROLLER

TECHNICAL FIELD

The disclosure relates to a track for a vehicle and a track roller.

BACKGROUND

Many off-road vehicles, such as earthmoving vehicles (e.g., excavators, skid steer track loaders or multi-terrain track loaders) and agricultural vehicles, include an endless track and a plurality of rollers. An endless track may help provide traction on surfaces that traditional wheels having a circular cross-section may not be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud).

In some cases, an endless track is formed of metal, rubber, such as a molded rubber, or a combination of metal and rubber. The endless track may be molded as a single, integral piece or an assembly of interconnected parts that are coupled together to define an endless track. The endless track typically includes a body with an interior surface that engages with a plurality of rollers, and an exterior surface that contacts the surface that the vehicle is traversing.

In some cases, a track roller is formed of rubber, such as a molded rubber. The roller may be molded as a single, integral piece or an assembly of interconnected parts that are coupled together to define a roller. The roller may be configured to contact the interior surface of the track and roll along the interior surface of the track.

The track and roller may be configured to maintain alignment of the track with respect to the roller and the vehicle as the roller rolls along the interior surface of the track.

SUMMARY

In general, the disclosure is directed to a track roller, a vehicle track (e.g., an endless track), systems including the track roller and the vehicle track, and methods for using and making the system. In some examples, a roller comprises an axle member and a plurality of flange members extending from the axle member and substantially perpendicularly to a rotational axis of the axle member about which the axle member rotates. In addition, in some examples, a track comprises a track member and a plurality of rows of guide-lug members extending from the track member and substantially perpendicularly to the track member. At least some of the flange members may be configured to contact portions of the track member of the track as the roller rolls with respect to the track. At least some portions of the axle member of the roller may be configured to contact the guide-lug members. The roller and track described herein may allow for increased load for a given track width without the risk of premature cracking of a more rigid track.

In one example, the disclosure is directed to a track roller and at least three flange members. The track roller comprises an axle member. The axle member defines a first axis. The at least three flange members extend from the axle member substantially perpendicularly to the first axis. A first portion of the axle member is disposed between a first pair of adjacent flange members of the at least three flange members. A second portion of the axle member is disposed between a second pair of adjacent flange members of the at least three flange members. Each of at least two of the at least three flange members are configured to contact a track when the track is mounted on a vehicle suspension system including the track roller. The first and second portions are configured to contact the track when the track is mounted on the vehicle suspension system.

In another example, the disclosure is directed to a system comprising a track and a track roller. The track roller comprises an axle member defining a first axis and at least three flange members extending from the axle member substantially perpendicularly to the first axis. A first portion of the axle member is disposed between a first pair of adjacent flange members of the at least three flange members. A second portion of the axle member is disposed between a second pair of adjacent flange members of the at least three flange members. Each of at least two of the at least three flange members are configured to contact a track when the track is mounted on a vehicle suspension system including the track roller. The first and second portions are configured to contact the track when the track is mounted on the vehicle suspension system.

In another example, the disclosure is directed to a track comprising a track member, a first plurality of guide-lug members, a second plurality of guide-lug members, and a second plurality of guide-lug members. The first plurality of guide-lug members extend from an inner side of the track member. The second plurality of guide-lug members extend from the inner side of the track member. The track member comprises a first end portion, a second end portion, and a middle portion disposed between the first and second end portions. The first and second plurality of guide-lug members extend from the middle portion of the track member. The first plurality of guide-lug members are configured to contact a first portion of a track roller when the track is mounted on a vehicle suspension system including the track roller. The second plurality of guide-lug members are configured to contact a second portion of the track roller when the track is mounted on the vehicle suspension system. The first end portion is configured to contact a third portion of the track roller when the track is mounted on the vehicle suspension system. The second end portion is configured to contact a fourth portion of the track roller when the track is mounted on the vehicle suspension system.

The details of one or more examples of the disclosure are set forth in the accompanying drawings and the description below. Other features, objects, and advantages will be apparent from the description and drawings, and from the claims.

DETAILED DESCRIPTION

In general, the disclosure is directed to a roller and a track for an endless track vehicle. The track may be mounted on a vehicle suspension system, which may include a drive system, including drive sprockets, and one or more rollers. The rollers may provide rolling support for an elongated section of the track that engages with the ground or other surface that the vehicle is traversing. Any suitable numbers of rollers may be engaged with the track depending on the length of the vehicle and track. The rollers may be connected to the body of the vehicle, such as by an axle that extends from the body, or a frame connected to the body, to the roller, such that the rollers bear the load of the vehicle. The rollers may transfer that load onto the track. The rollers may roll with respect to the track and the track may roll with respect to a surface over which the vehicle is traversing. The rollers may roll at a frequency of rotation that is greater than that of the track such that any particular portion of the roller may be configured to contact different portions of the track as the roller rotates with respect to the track. The roller and track described herein may be configured to have additional contact points between the roller and the track than conventional systems, allowing for more even distribution of the weight of the vehicle over the width of the track and, thus, for larger load capacity for a given track width and/or the use of a narrower track width for a given load without the traditional risks of premature cracking or decreased useful life of conventional track and roller systems. The roller and track may further provide more secure engagement between the roller and the track, resulting in more secure alignment of the track with the roller.

A track, such as a rubber track, may have a limited load capacity. Generally, the wider a track, the greater load capacity it may have. However, some vehicles, such as trenching machines or stump cutting machines, may require the vehicle, and thus the vehicle track, to be narrow and yet carry a relatively heavy load.

One potential solution is to use a very rigid track, which may support larger loads on a narrow track. However, such a track may be susceptible to cracking prematurely. The roller and track described herein may allows for increased load for a given track width without the risk of premature cracking of a more rigid track.

The roller and track described herein are configured to help distribute a weight of a vehicle more evenly across the track, which may allow for heavier loads to be carried on narrower track. A roller may impart weight of a vehicle onto a track. Having multiple contacts between the roller and the track may allow for the roller to distribute the weight of the vehicle over the multiple contacted portions of the track, including portions of the track member and the guide-lug members, providing more even load distribution across the width of the track. More even distribution of weight on the track may allow for less and/or slower wear on the track given the same vehicle weight and track size, which may result in increased useful life of the track. Alternatively, and/or in addition, more even weight distribution on the track width may also allow for increased vehicle weight on a track of the same size and/or reduced track size for the same vehicle weight with a lower likelihood of track failure. Thus, the ratio of vehicle weight to track size may be reduced such that weight operating range may be increased for certain track widths. This may be advantageous in that a vehicle of a given weight may require a track with a smaller width and/or thickness than previously required. The narrower and/or thinner track may allow for increased maneuverability of the vehicle.

The roller and track described herein additionally allow for the track to stay aligned with the roller and, thus, the vehicle. The roller includes a center flange that engages with the track between two rows of guide-lug members of the track, keeping the track laterally in line with the roller and the vehicle and preventing the vehicle from moving from laterally from one side to another.

Figure 1:
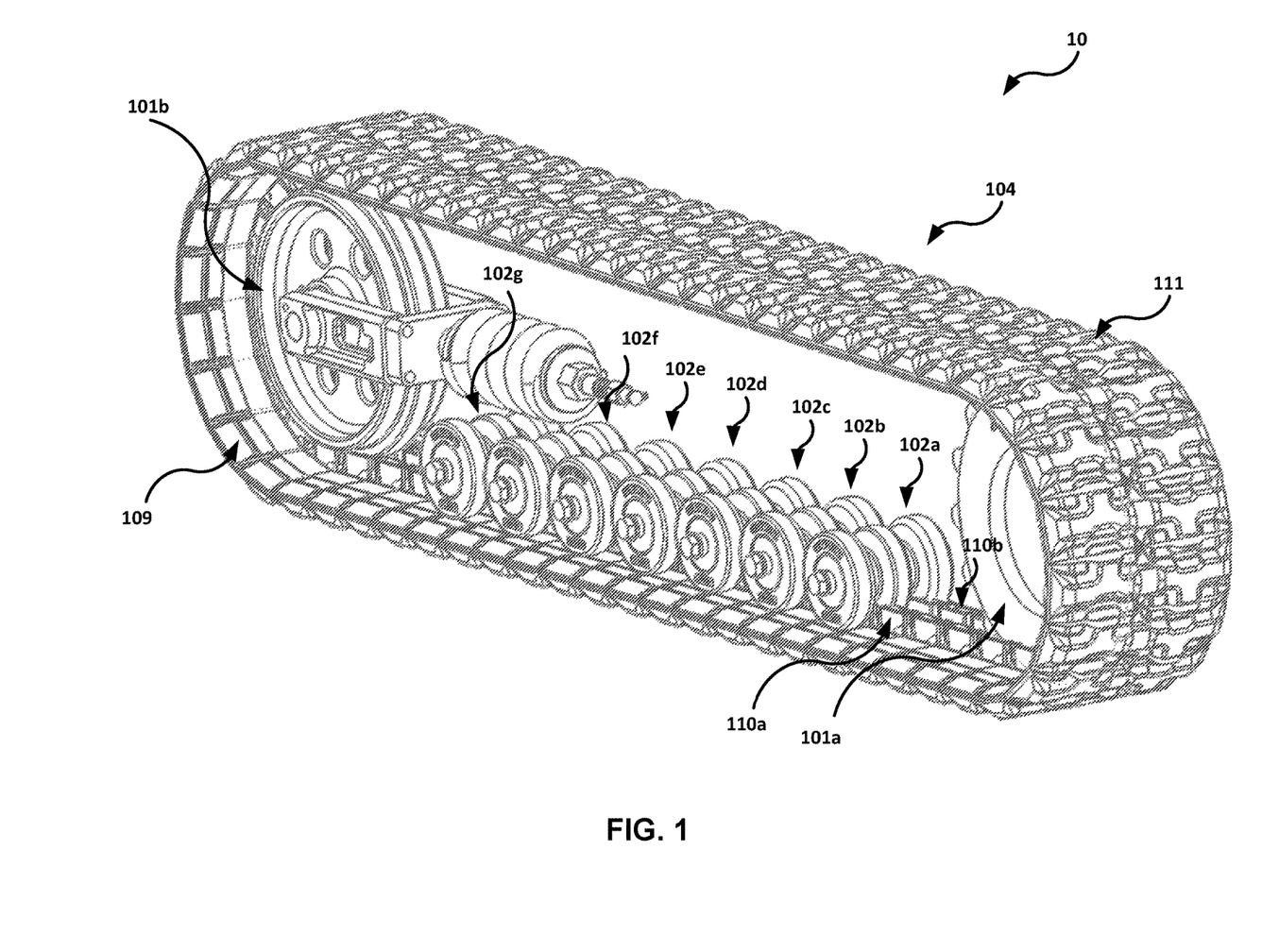
FIG. 1 is a schematic perspective view illustrating an example system including an endless track mounted about drive sprocket wheels and rollers.

FIG. 1 is a schematic perspective view illustrating an example system 10 including an endless track 104 mounted about drive sprocket wheels 101a and 101b and rollers 102a-102g.

Drive sprocket wheels 101a and 101b may be, for example, a part of a drive system of a vehicle. Drive sprocket wheels 101a and 101b, which can be actuated by a drive motor, engage with endless track 104 and rotate endless track 104 as drive sprocket wheels 101a, 101b rotate. As endless track 104 rotates and engages with a ground surface, a vehicle on which endless track 104 is mounted moves, depending on the direction in which endless track 104 rotates. In other examples, other drive mechanisms may be used to drive endless track 104. Endless track 104 may be used with an industrial vehicle, such as, but not limited to, an earthmoving vehicle (e.g., a skid steer loader) or an agricultural vehicle (e.g., a tractor).

Endless track 104 may include an interior surface 109 and an exterior surface 111. Disposed between interior surface 109 and exterior surface 111 of endless track 104 may be one or more rigid cores, which are described in further detail below.

Interior surface 109 defines an inner circumference of endless track 104 and may be configured to mount endless track 104 to a drive system of a vehicle. In the example of FIG. 1, exterior surface 111 comprises two rows of guide lug members 110a and 110b (collectively "guide lug members 110") that may enable alignment and engage drive sprocket wheels 101a and 101b and rollers 102a-102g with endless track 104. In some examples, guide lug members 110 may define a channel that may be sized and shaped to receive drive sprocket wheels 101a and 101b and rollers 102a-102g. Guide lug members 110 will be described in further detail below with reference to FIGS. 2-4.

While drive sprocket wheels 101a and 101b are shown in the example of FIG. 1, in other examples, other drive systems may be used to support and drive endless track 104.

Exterior surface 111 of endless track 104 defines an outer circumference of endless track 104 and may be configured to engage with an exterior surface (e.g., the ground). In some examples, endless track 104 with exterior surface 111 comprising a tread pattern may be configured to engage the exterior surface, which may be defined by multiple traction portions extending from a common surface.

Rollers 102a-102g may be positioned on interior surface 109 of the endless track 104 when the endless track 104 is mounted on a suspension system of a vehicle, the suspension system including the rollers 102a-102g. As endless track 104 rotates, rollers 102a-102g may roll with respect to endless track 104. Rollers 102a-102g may distribute weight of the vehicle onto endless track 104.

The rollers 102-102g may function to guide track 104 such that track 104 may move smoothly. The rollers may also support the load of the vehicle and transfer that load to track 104. The required number of rollers may be based on total length of track 104 and/or the vehicle. Each of the rollers may be of a variety of different types.

Figure 2:
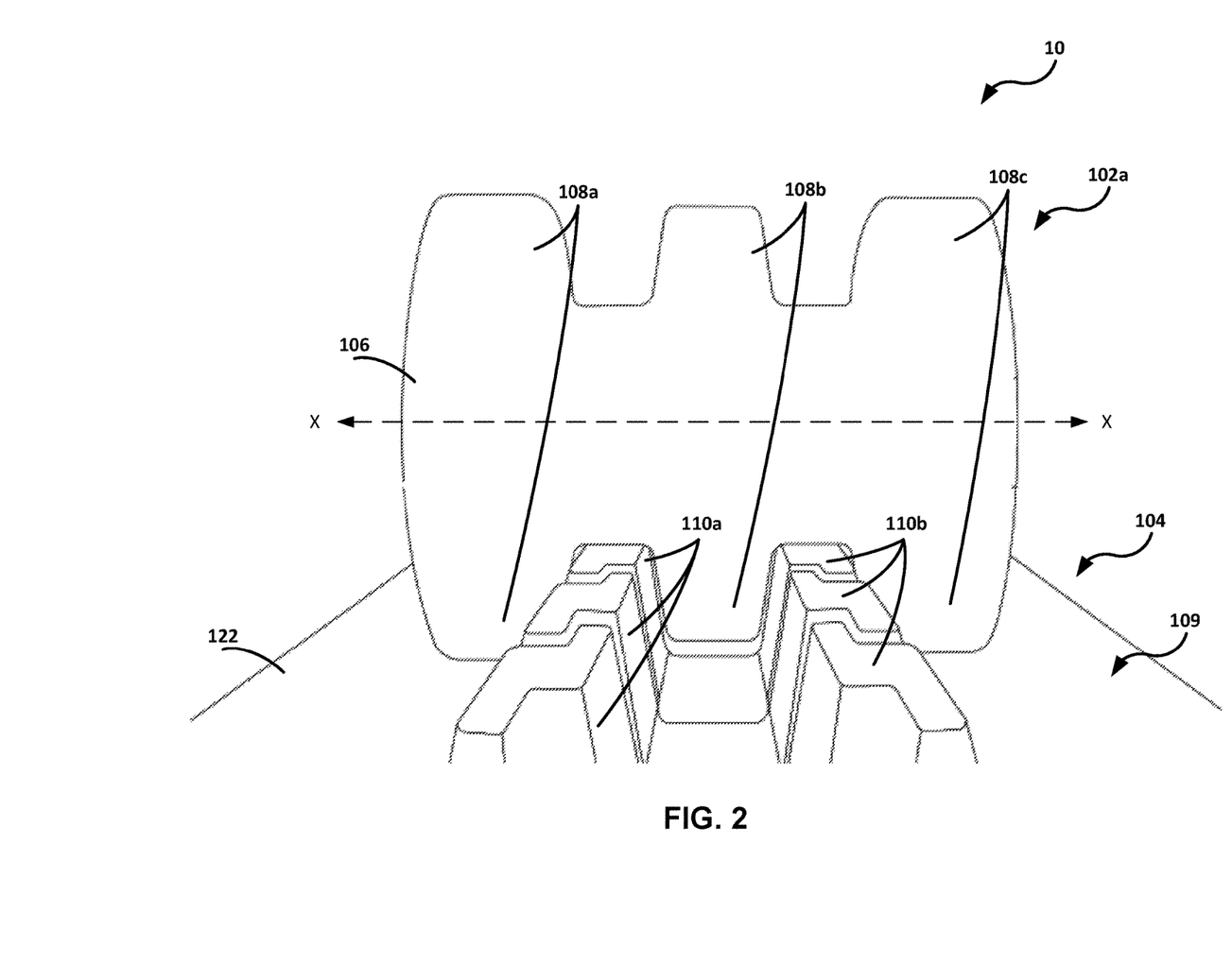
FIG. 2 is a schematic perspective view of the system of FIG. 1 illustrating an example roller of the rollers of FIG. 1 on a part of the endless track of FIG. 1.

FIG. 2 is a schematic perspective view of the system 10 of FIG. 1 illustrating an example roller 102a of the rollers 102a-102g of FIG. 1 on a part of the endless track 104 of FIG. 1. As shown in FIG. 2, roller 102a may be one or a plurality of rollers 102a-102g configured to engage with track 104 when track 104 is mounted on a vehicle suspension system including roller 102. Roller 102a may include axle member 106 and flange members 108. Axle member 106 may be a substantially cylindrical portion of roller 102a that extends along axis X. Roller 102a may rotate relative to axis X, such that axis X may also be referred to as a rotational axis. As roller 102a does so, it rolls and moves with respect to track 104 as track 104 rolls at a lower frequency than that of roller 102a. In the illustrated example, track roller 102a includes three flange members 108a-108c. Flange members 108a-108c may extend from axle member 106 substantially perpendicularly to axis X (e.g., perpendicular to axis X or effectively perpendicular to axis X). Flange member 108a may extend from axle member portion 112a of axle member 106 at a first end of axle member 106. Flange member 108c may extend from axle member portion 112e at an opposite end of axle member 106. Flange member 108b may extend from axle member portion 112c of axle member 106 disposed between flange member 108a and 108b and substantially in the middle of axle member 106. In the illustrated example, flange members 108a and 108c may be configured to contact endless track 104 and distribute weight onto endless track 104 while, in some examples, flange member 108b does not contact track 104. Each of flange members 108a, 108b, and 108c may be configured to keep endless track 104 aligned with roller 102a as roller 102a rolls with respect to endless track 104.

In some cases, track roller 102a is formed of rubber, such as a molded rubber. Roller 102a may be molded as a single, integral piece or an assembly of interconnected parts that are coupled together to define roller 102a. However, in other examples, track roller 102a may be formed from another suitable material, such as a plastic or metal, or any combinations thereof.

Endless track 104 may include track member 122 and guide-lug members 110. At least a portion of track member 122 may extend substantially along a plane parallel to a surface that the vehicle is traversing when, for example, the surface is planar. Track member 122 may define exterior surface 111 (shown in FIG. 1) of endless track 104 that contacts the surface that the vehicle is traversing and may define a part of interior surface 109 of endless track 104 that roller 102a is configured to contact and roll on. Guide-lug members 110 further define a portion of interior surface 109 of endless track 104 that roller 102a is configured to engage with when track 104 is mounted on the vehicle suspension system.

Guide-lug members 110 may include a first row of guide-lug members 110a and a second row of guide-lug members 110b, as will be further described below with reference to FIG. 4. Guide-lug members 110 may extend from an inner side of track member 122. When track 104 is mounted on the vehicle suspension system and in contact with roller 102a, guide-lug members 110a may extend toward roller 102a and between flange members 108a and 108b and guide-lug members 110b may extend toward roller and between flange members 108b and 108c. Accordingly, guide-lug members 110 may help to keep endless track 104 aligned with roller 102a by containing flange member 108b between guide-lug members 110a and 110b, containing flange member 108a to an outer side of guide-lug members 110a and containing flange member 108c to an outer side of guide-lug members 110b. Guide-lug members 110 may additionally contact portions of axle member 106 of roller 102a between adjacent flange members 108, including axle member portions 112b and 112d, to allow weight of the vehicle to be distributed to guide-lug members 110.

In some cases, endless track 104 is formed of metal, rubber, such as a molded rubber, or a combination of metal and rubber. Endless track 104 may be molded as a single, integral piece or an assembly of interconnected parts that are coupled together to define endless track 104.

Figure 3A:
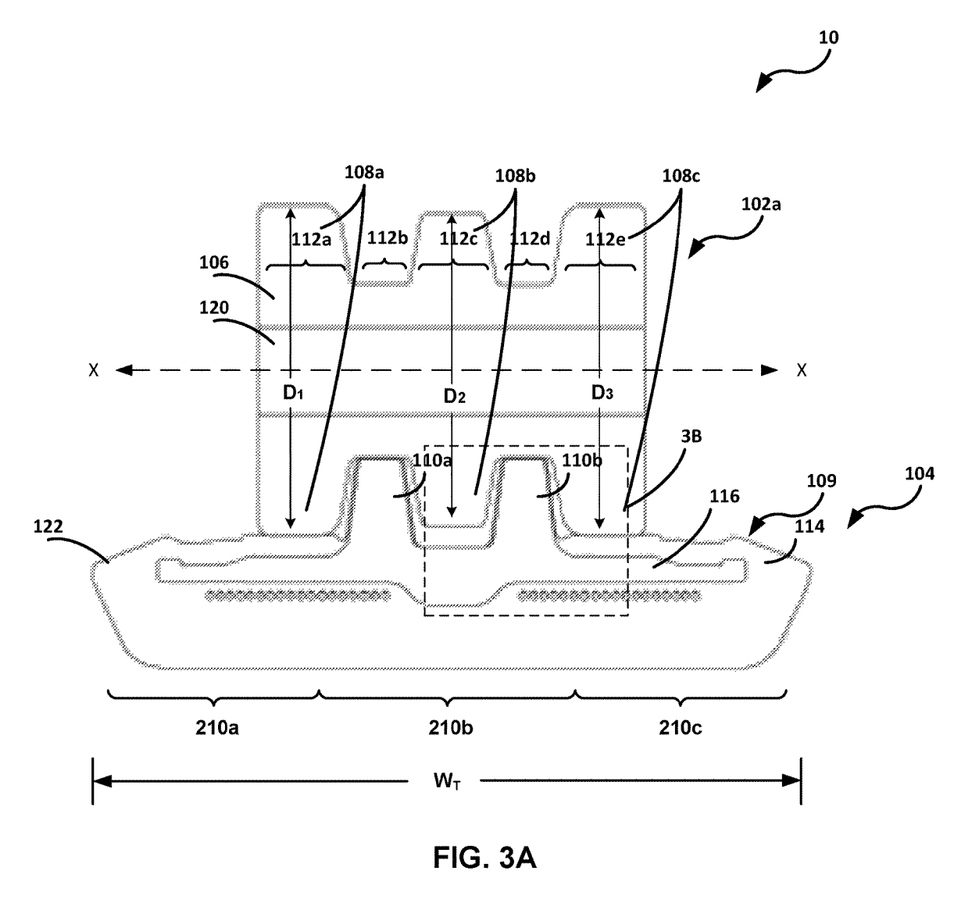
FIG. 3A is a schematic cross-sectional view of the roller and track shown in FIG. 2, further illustrating various features of the track and roller.

FIG. 3A is a schematic cross-sectional view of the roller 102a and track 104 shown in FIG. 2, further illustrating various features of roller 102a and endless track 104. The cross-section is taken through a center of roller 102a in FIG. 2, through axis X.

Axle member 106 of roller 102a may include aperture 120. Aperture 120 may be an opening through which an axle of a vehicle may pass and, in some examples, may be secured within axle member 106. When roller 102a is mounted to axle member 106, axle member 106 transfers weight of the vehicle to roller 102a, which may transfer that weight onto endless track 104.

Axle member 106 may define axle member portion 112b and axle member portion 112d. Axle member portion 112b may be a portion of axle member 106 disposed between the pair of adjacent flange members 108a and 108b. Axle member portion 112d may be a portion of axle member 106 disposed between the pair of adjacent flange members 108b and 108c. Axle member portions 112b and 112d may be configured to contact guide-lug members 110 as roller 102a rolls with respect to endless track 104 such that weight of the vehicle may at least partially be imparted onto guide-lug members 110.

Endless track 104 may include end track portion 210a and end track portion 210c. Endless track 104 may further include middle track portion 210b disposed between end track portion 210a and end track portion 210b. When endless track 104 is mounted on a vehicle suspension system and in contact with roller 102a, guide lug members 110 may extend from middle track portion 210b of endless track 104 toward axle member 106 and may be configured to contact axle member portions 112b and 112d to absorb at least some of the weight of the vehicle from roller 102a. Each of end track portion 210a, middle track portion 210b, and end track portion 210c may be configured to contact roller 102a, such that weight of the vehicle may be distributed across each of track portions 210.

Endless track 104 may be defined by a single molded piece of material or may be an assembly of interconnected parts that are coupled or bonded together to define an endless track. In some examples, endless track 104 is composed at least in part of a natural rubber, synthetic rubber, or combinations thereof or other elastomeric materials. Examples of suitable synthetic rubbers include styrene butadiene rubber and polybutadiene rubber. Of course, endless track 104 may also include other agents and activators to help achieve desired material properties, such as reinforcing agents, vulcanization accelerators, antiozonants, antioxidants, vulcanizing agents, retarders, rubber softeners, tackifiers, and so forth. The exact composition of endless track 104 may depend upon various factors, including the particular application endless track 104 is intended to be used with and the range of applications. An elastomeric material may help provide better maneuverability of a vehicle, better ride quality, and increased traction as compared to steel endless tracks.

Endless track 104 may have any suitable total width $W_T$, which may depend upon the particular application of endless track 104 and vehicle with which endless track 104 is used. In one example in which endless track 104 is used with a skid steer loader, endless track 104 has a width $W_T$ (measured in a direction along transverse axis 48) of about 150 millimeters (mm) to about 500 mm. In one example, width $W_T$ is about 180 mm. In other examples, width $W_B$ is about 200 mm, 230 mm, 300 mm, 320 mm, 400 mm, and 450 mm.

Different portions of roller 102a may be configured to contact different portions of endless track 104. For example, flange member 108a may be configured to contact end track portion 210a, axle member portion 112b may be configured to contact guide-lug members 110a, axle member portion 112d may be configured to contact guide-lug members 110b, and flange member 108c may be configured to contact end track portion 210c. In some examples, flange member 108b is not configured to contact endless track 104 when endless track 104 is in engaged with roller 102a, even though the other flange members 108a, 108b contact track 104 when endless track 104 is engaged with roller 102a. In other examples, flange member 108b may be configured to contact endless track 104 such that all three flange members 108a-108c may be configured to contact endless track 104. In other examples, roller 102a may include additional flange members 108 that may or may not be configured to contact endless track 104. Having these multiple contacts between roller 102a and endless track 104 may allow for roller 102a to distribute weight of the vehicle over the multiple contacted portions of endless track 104, such that the weight of the vehicle is more evenly distributed over the width $W_T$ of endless track 104.

In contrast, if fewer portions of roller 102a contact endless track 104, then the weight of the vehicle may be less evenly distributed across with endless track 104, which may result in stress points and compromise the structural integrity of endless track 104 or at least decrease the useful life of endless track 104 relative to the example shown in FIG. 3A.

Flange member 108a may define outer dimension $D_1$ measured perpendicular to axis X. Flange member 108b may define outer dimension $D_2$ measured perpendicular to axis X. Flange member 108c may define outer dimension $D_3$ measured perpendicular to axis X. In some examples, outer dimension $D_1$ of flange member 108a and outer dimension $D_3$ of flange member 108c may be substantially equal, which may help more evenly distribute forces across track 104. However, in other examples, outer dimension $D_1$ of flange member 108a and/or outer dimension $D_3$ of flange member 108c may be substantially unequal.

In some examples, outer dimension $D_2$ of flange member 108b may be substantially smaller than outer dimension $D_1$ of flange member 108a and outer dimension $D_3$ of flange member 108c. For example, outer Dimension $D_2$ of flange member 108b may be less than or approximately equal to 80% of outer dimension $D_1$ of flange member 108a and outer dimension $D_3$ of flange member 108c. In other examples, outer dimension $D_2$ of flange member 108b may be substantially equal to outer dimension $D_1$ of flange member 108a and/or outer dimension $D_3$ of flange member 108c. Each of flange members 108 may have any suitable relative dimensions and absolute dimensions $D_1$, $D_2$, and $D_3$, which may be selected according to the intended use of track 104 and the desired vehicle weight distribution across track 104.

In the example illustrated in FIG. 3A, flange members 108 and endless track 104 are dimensioned such that flange members 108a and 108c contact endless track 104 and flange member 108b does not contact track. Thus, flange members 108a and 108c may distribute weight of a vehicle onto endless track 104 while flange member 108b may not. In other examples, dimensions of flange members 108 and/or endless track 104 may be changes such that, for example, flange member 108b contacts endless track 104 and, in addition to flange members 108a and 108c, imparts weight of the vehicle onto track.

Endless track 104 has any suitable configuration. For example, endless track 104 may include rubber portion 114 and rigid core 116, as shown in FIG. 3A. Rubber portion 114 may be a portion of endless track 104 composed at least in part of a natural rubber, synthetic rubber, or combinations thereof or other elastomeric materials. Examples of suitable synthetic rubbers include styrene butadiene rubber and polybutadiene rubber. Rubber portion 114 may allow for endless track 104 to have flexibility in rotating and traversing terrain.

Rigid core 116 may be a portion of endless track 104 composed of iron or any other suitable material more rigid than rubber portion 114 in order to increase the strength of endless track 104. In some examples, rigid core 116 may be embedded in endless track 104, e.g., in rubber portion 114. For example, in examples in which endless track 104 comprises multiple layers of material, rigid core 116 may be positioned between layers of material. Alternatively, in examples in which endless track 104 is molded, rigid core 116 may be introduced into the molding material prior to curing the material to form endless track 104. Rigid core 116 may allow endless track 104 to be stronger than if comprised entirely of rubber or similar material(s). The combination of rubber portion 114 and rigid core 116 may thus allow endless track 104 to be strong enough to absorb the weight of a vehicle but also flexible enough to rotate and traverse rugged terrain.

Rigid core 116 may be made of any suitable material and in any suitable configuration. In the example shown in FIG. 3A, rigid core 116 is comprised steel, iron or another metal. In some examples, rigid core 116 is composed of sections, that protrude to partially or substantially to form guide-lug members 110, and the remainder of the body of rigid core 116. These portions of rigid core 116 may or may not be integrated into a single rigid core. For example, in examples in which rigid core 116 is a single, integral component, rigid core 116 may be manufactured by hot forging, using metal rods or, alternatively, rigid core 116 may be cast from metal.

While rigid core 116 is shown in FIG. 3A as having a particular shape, in other examples, rigid core 116 may be any suitable configuration. Track portions 210 of endless track 104 configured to absorb weight of a vehicle may comprise, at least in part, portions of the rigid core 116. For example, track portions 210 of endless track 104 configured to contact flange member 108a, flange member 108, axle member portion 112b, and axle member portion 112d, may include portions of rigid core 116 in order to absorb weight of the vehicle from the contacted portions of the roller 102a. Thus, weight of the vehicle may be distributed across different portions of rigid core 116 within endless track 104. The more even distribution of weight across the rigid core 116 may help to maintain the structural integrity of rigid core 116 and may prevent breaking of rigid core 116.

Guide-lug members 110 may each, by volume, be substantially composed of rigid core 116. Track end portion 210a and track end portion 210c may each, by volume, be substantially composed of rubber portion 114.

By contacting different portions of endless track 104, roller 102a may be configured to distribute weight across different portions of endless track 104. For example, by contacting track end portion 210a, track end portion 210c, guide-lug members 110a, and guide-lug members 110b, roller 102a may distribute weight of a vehicle onto these different portions of track 104. In some examples, roller 102a may be configured to distribute weight substantially evenly between different portions of endless track 104. In other examples, roller 102a may be configured to distribute weight substantially differently between the different portions of endless track 104. Distributing weight laterally over endless track 104 may help reduce the occurrence of cracking or other wear in any areas of endless track 104 that may otherwise bear more weight.

Although an example system 10 has been described, any suitable modification may be made according to particular needs. For example, while FIGS. 1, 2, and 3A illustrate roller 102a including three flange members 108, roller 102a may include additional or fewer flange members 108. For example, roller 102a may include two flange members 108, including flange member 108a and 108c and may exclude the central flange member 108c. As another example, roller 102a may include additional flange members 108 that may or may not be configured to contact endless track 104. For example, additional flange members 108 may extend from axle member 106 toward track member 122 and may or may not be configured to contact one of track end portion 210a, track end portion 210c, or track middle portion 210b.

Figure 3B:
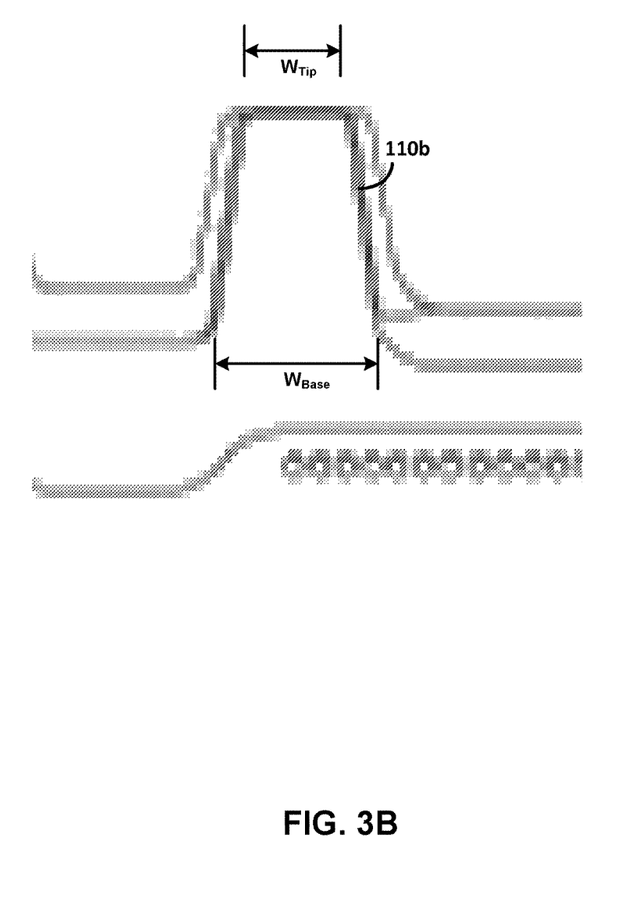
FIG. 3B illustrates a portion of FIG. 3A, labeled 3B in FIG. 3A, in further detail.

FIG. 3B illustrates a portion of FIG. 2A, labeled 2B, in further detail. In some examples, guide-lug members 110 may each have a tip width $W_{Tip}$, which is the width of the respective guide-lug member at its tip, the portion of the guide lug member furthest from the track member 114, of about 3 mm to about 10 mm and a base width, $W_{Base}$, which is the width of the respective guide-lug member at its base, the portion of the guide-lug member closest to track member 122, of about 15 mm to about 25 mm. In one example, tip width, $W_{Tip}$, is about 6 mm and base width, $W_{Base}$, is about 21 mm.

Figure 4:
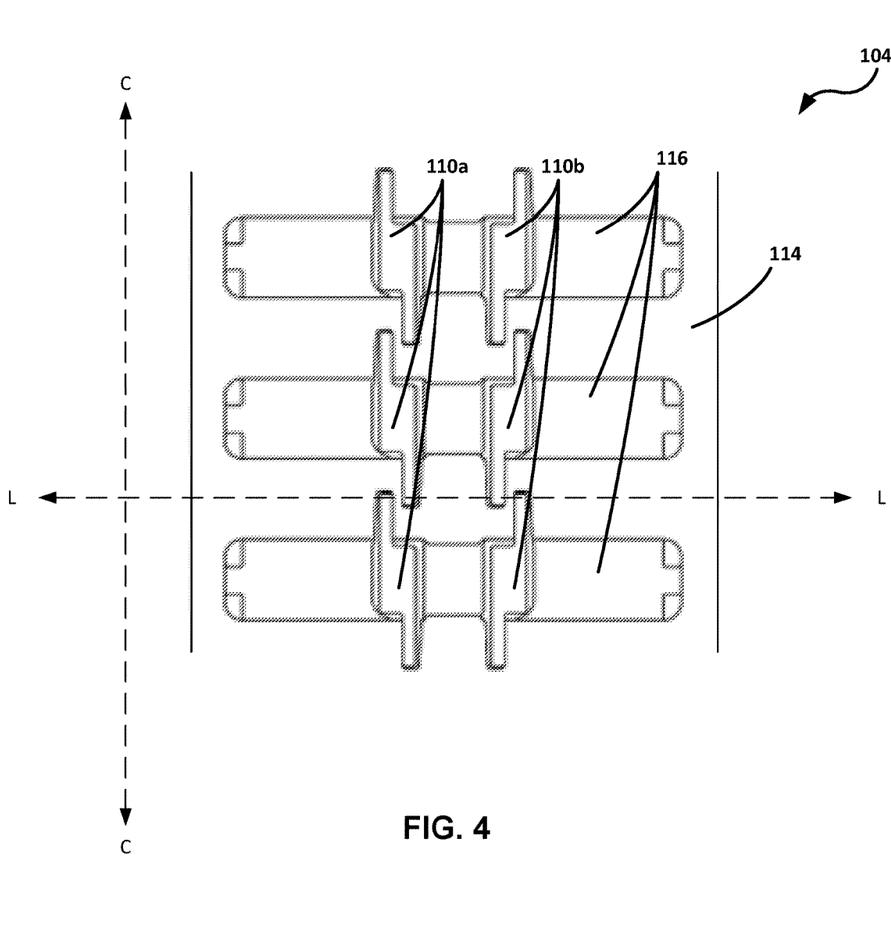
FIG. 4 is a schematic plan view of the body of the endless track shown in FIGS. 1-3B, further illustrating various features of the track.

FIG. 4 is a schematic plan view of the body of the endless track 104 shown in FIGS. 1-2, further illustrating various features of the track 104. As described with reference to FIG. 1, endless track 104 may comprise rubber portion 114 and rigid core 116. Guide lug members 110 may protrude from track and may be substantially formed from rigid core 116. Endless track 104 may roll in a circumferential direction C and about lateral axis L.

As illustrated in FIG. 3A, guide lug members 110 may be in two rows that extend circumferentially along endless track 104, with one row including guide-lug members 110a and one row including guide-lug members 110b. The rows may be space from each other in a lateral direction. Each row may be arranged and shaped such that, when track 104 is engaged with roller 102a, at least one guide-lug member 110 from each row is configured to contact a portion of roller 102a at any time as roller 102a moves with respect to endless track 104. For example, adjacent pairs of guide-lug members 110 in the same row of guide-lug members 110 may be configured to overlap in the lateral direction across endless track 104. For example, a line extending parallel to lateral axis L, such as that illustrated as lateral axis L, may intersect portions of each of a pair of adjacent guide-lug members 110. This may provide additional benefit. For example, guide-lug members 110 may be "S" shaped, such that end portions of guide-lugs members 110 may be smaller than central portions of guide-lug members 110. A smaller end portion of a guide-lug member 110 may be able to work in combination with a laterally overlapping end portion of an adjacent guide lug member 110 in the same row of guide-lug members 110 to distribute weight from the roller across the width of endless track 104. Thus, weight of a vehicle may be distributed substantially the same over the different portions of endless track 104 whether roller 102a is on top of middle portions of guide-lug members 110 or end portions of guide-lug members 110.

Although an example endless track 104 has been described, any suitable modification may be made according to particular needs. For example, although FIG. 3 illustrates the two rows of guide-lug members 110 being substantially symmetrical about a longitudinal center of endless track 104, such that roller 102a will be located on a middle portion of one of guide-lug members 110a at the same time that it is located on a middle portion of one of guide-lug members 110b and roller 102a will be located on end portions of an adjacent pair of guide-lug members 110a at the same time that it is located on end portions of an adjacent pair of guide-lug members 110b, the two rows of guide-lug members 110 may instead be staggered such that roller 102a may be located on a middle portion of one of guide-lug members 110a at the same time that it is located on end portions of an adjacent pair of guide-lug members 110b and such that roller 102a may be located on end portions of an adjacent pair of guide-lug members 110a at the same time that it is located on a middle portion of one of guide-lug members 110b.

Alternatively or in addition, guide-lug members 110 may be configured to have any suitable shape, size, and/or composition. For example, guide-lug members 110 may have any suitable height, width, and/or length and roller 102a may be dimensioned to allow for four or more contacts between roller 102a and endless track 104 including guide-lug members 110. For example, an increase in a height of guide-lug members 110 may necessitate that flange members 108a and 108c have a longer radius to allow for sufficient contacts between roller 102a and endless track 104 and suitable distribution of weight across endless track 104. As another example, an increase in a width of guide-lug members 110 may necessitate more space between adjacent pairs of flange members 108 to allow for sufficient contacts between roller 102a and endless track 104. Thus, while the dimensions of roller 102a and endless track 104 may vary according to particular needs, the dimensions may be configured such that roller 102a and endless track 104 maintain at least four points of contact as described herein and thus maintain distribution of weight of a vehicle across the width $W_T$ of endless track 104.

In some examples, a method may include mounting roller 102a on a vehicle axle and mounting endless track 104 on a vehicle suspension system including roller 102a such that endless track 104 is in engaged with roller 102a, e.g., as shown in FIG. 1. When endless track 104 is engaged with roller 102a, roller 102a may contact endless track 104 at multiple contact points and may distribute the weight of the vehicle across those different contact points. A method may further include mounting endless track 104 to a drive system of the vehicle and driving the vehicle by actuating the drive system to cause the endless roller 104 to rotate and, thus, the roller 102a to rotate. Rotation of the endless track 104 may cause the endless track 104, and thus the vehicle, to move with respect to a surface upon which the vehicle is on.

Various examples have been described. These and other examples are within the scope of the following claims.

What is claimed is:

1. A track roller comprising:
   an axle member defining a first axis; and
   at least three flange members extending from the axle member substantially perpendicularly to the first axis,
   wherein a first portion of the axle member is disposed between a first pair of adjacent flange members of the at least three flange members,
   wherein a second portion of the axle member is disposed between a second pair of adjacent flange members of the at least three flange members,
   wherein each of at least two of the at least three flange members are configured to contact a track when the track is mounted on a vehicle suspension system including the track roller, and
   wherein the first and second portions are configured to contact the track when the track is mounted on the vehicle suspension system.

2. The track roller of claim 1, wherein the at least two of the at least three flange members configured to contact the track comprise a first flange member and a second flange member, the first flange member extending from a third portion of the axle member at a first end of the axle member and second flange member extending from a fourth portion of the axle member at a second end of the axle member.

3. The track roller of claim 2, wherein the at least three flange members further comprises a third flange member extending from a fifth portion of the axle member disposed between the first and second portions of the axle member.

4. The track roller of claim 1, wherein the at least two of the at least three flange members comprise a first flange member and a second flange member, wherein the first flange member is configured to contact a first portion of the track, the first portion of the track primarily, by volume, comprising rubber and the second flange member is configured to contact a second portion of the track, the second portion of the track primarily, by volume, comprising rubber.

5. The track roller of claim 4, wherein the first portion of the axle member is configured to contact a third portion of the track, the third portion of the track primarily, by volume, comprising a first portion of a rigid core and the second portion of the axle member is configured to contact a fourth portion of the track, the fourth portion of the track primarily, by volume, comprising a second portion of the rigid core.

6. The track roller of claim 1, wherein the at least two of the at least three flange members and the first and second portions of the axle member are each configured to contact different portions of the track and the track roller is configured to distribute weight between the different portions of the track.

7. The track roller of claim 6, wherein the track roller is configured to distribute weight substantially evenly between the different portions of the track.

8. The track roller of claim 1, wherein the at least three flange members consist of only three flange members, and wherein the roller has only three flange members extending from the axle member substantially perpendicularly to the first axis.

9. The track roller of claim 1, wherein only two of the at least three flange members are configured to contact the track.

10. The track roller of claim 1, wherein the at least two of the at least three flange members comprise a first flange member defining a first outer dimension perpendicular to the first axis and a second flange member defining a second outer dimension perpendicular to the first axis, the at least three flange members further comprising a third flange member defining a third outer dimension perpendicular to the first axis, and
wherein the first dimension and the second dimension are substantially equal and the third dimension is substantially smaller than the first dimension.

11. A system comprising:
    a track; and
    a track roller comprising:
       an axle member defining a first axis; and
       at least three flange members extending from the axle member substantially perpendicularly to the first axis;
       wherein a first portion of the axle member is disposed between a first pair of adjacent flange members of the at least three flange members,
       wherein a second portion of the axle member is disposed between a second pair of adjacent flange members of the at least three flange members,
       wherein each of at least two of the at least three flange members are configured to contact the track when the track is mounted on a vehicle suspension system including the track roller, and
       wherein the first and second portions are configured to contact the track when the track is mounted on the vehicle suspension system.

12. The system of claim 11, wherein the at least two of the at least three flange members configured to contact the track comprise a first flange member and a second flange member, the first flange member extending from a third portion of the axle member at a first end of the axle member and second flange member extending from a fourth portion of the axle member at a second end of the axle member.

13. The system of claim 12, the at least three flange members further comprising a third flange member extending from a fifth portion of the axle member disposed between the first and second portions of the axle member.

14. The system of claim 11, wherein the at least two of the at least three flange members comprise a first flange member and a second flange member, wherein the first flange member is configured to contact a first portion of the track, the first portion of the track primarily, by volume, comprising rubber and the second flange member is configured to contact a second portion of the track, the second portion of the track primarily, by volume, comprising rubber.

15. The system of claim 14, wherein the first portion of the axle member is configured to contact a third portion of the track, the third portion of the track primarily, by volume, comprising a first portion of a rigid core and the second portion of the axle member is configured to contact a fourth portion of the track, the fourth portion of the track primarily, by volume, comprising a second portion of the rigid core.

16. The system of claim 11, wherein the at least two of the at least three flange members and the first and second portions of the axle member are each configured to contact different portions of the track and the track roller is configured to distribute weight between the different portions of the track.

17. The system of claim 16, wherein the track roller is configured to distribute weight substantially evenly between the different portions of the track.

18. The system of claim 11, wherein the at least three flange members consist of only three flange members, and wherein the roller has only three flange members extending from the axle member substantially perpendicularly to the first axis.

19. The system of claim 11, wherein only two of the at least three flange members are configured to contact the track.

20. A track comprising:
a track member;
a first plurality of guide-lug members extending from an inner side of the track member; and
a second plurality of guide-lug members extending from the inner side of the track member,
wherein the track member comprises a first end portion, a second end portion, and a middle portion disposed between the first and second end portions,
wherein the first and second plurality of guide-lug members extend from the middle portion of the track member,
wherein the first plurality of guide-lug members are configured to contact a first portion of a track roller when the track is mounted on a vehicle suspension system including the track roller,
wherein the second plurality of guide-lug members are configured to contact a second portion of the track roller when the track is mounted on the vehicle suspension system,
wherein the first end portion is configured to contact a third portion of the track roller when the track is mounted on the vehicle suspension system, and
wherein the second end portion is configured to contact a fourth portion of the track roller when the track is mounted on the vehicle suspension system.

* * * * *